(12) United States Patent
Wilhelmsson et al.

(10) Patent No.: US 11,326,499 B2
(45) Date of Patent: May 10, 2022

(54) METHOD FOR CONTROLLING REGENERATION OF AN EXHAUST GAS AFTERTREATMENT SYSTEM OF AN INTERNAL COMBUSTION ENGINE ARRANGED ON A VEHICLE

(71) Applicant: Volvo Truck Corporation, Gothenburg (SE)

(72) Inventors: Martin Wilhelmsson, Gothenburg (SE); Mattias Johansson, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/054,460

(22) PCT Filed: May 16, 2018

(86) PCT No.: PCT/EP2018/062729
§ 371 (c)(1),
(2) Date: Nov. 10, 2020

(87) PCT Pub. No.: WO2019/219186
PCT Pub. Date: Nov. 21, 2019

(65) Prior Publication Data
US 2021/0054773 A1 Feb. 25, 2021

(51) Int. Cl.
*F01N 9/00* (2006.01)
*F02D 41/02* (2006.01)

(52) U.S. Cl.
CPC ............ *F01N 9/00* (2013.01); *F02D 41/027* (2013.01); *F01N 9/002* (2013.01);
(Continued)

(58) Field of Classification Search
CPC .... F01N 9/00; F01N 9/002; F01N 2900/1606; F01N 2900/0422; F01N 2900/08;
(Continued)

(56) References Cited

U.S. PATENT DOCUMENTS

2012/0159930 A1* 6/2012 Snopko ............... F01N 9/002
60/274
2013/0227933 A1* 9/2013 O'Neil ............... F01N 3/023
60/274
(Continued)

FOREIGN PATENT DOCUMENTS

CN          1666014 A       9/2005
CN        101048579 A      10/2007
(Continued)

OTHER PUBLICATIONS

International Search Report and Written Opinion for PCT/EP2018/062729, dated Jul. 5, 2018, 13 pages.
(Continued)

*Primary Examiner* — Brandon D Lee
(74) *Attorney, Agent, or Firm* — Withrow & Terranova, PLLC

(57) ABSTRACT

The invention concerns a method for controlling regeneration of an exhaust gas aftertreatment system (7, 8) of an internal combustion engine (4) arranged on a vehicle (1), wherein the vehicle (1) is provided with a control system configured to control the regeneration in at least a first regeneration strategy mode comprising a first set of predetermined actions to be taken for controlling initialization and performance of regeneration processes. The method comprises the steps of: (100)—adapting the control system so as to be configured to alternatively control the regeneration in a second regeneration strategy mode, wherein the second regeneration strategy mode comprises a second set of predetermined actions to be taken for controlling initialization and performance of regeneration processes, and wherein the first and second regeneration strategy modes differ from each other in that the first and second set of predetermined regeneration control actions differ from each other; (200)—collecting, during operation of said vehicle (1) or of another
(Continued)

vehicle, data on an exhaust gas regeneration capability of said vehicle (1) or the other vehicle as a function of time; and (300)—evaluating, based on the collected data and the difference between the first and second regeneration strategy modes, whether the first or the second regeneration strategy mode is the most suitable for said vehicle (1) if operating under conditions corresponding to the operational conditions for the vehicle for which data were collected. The invention also concerns a vehicle arranged to be the subject of such a method and to a computer program product, a computer readable medium and a control system related to performance of the steps of the above method.

19 Claims, 2 Drawing Sheets

(52) U.S. Cl.
CPC .. *F01N 2900/0422* (2013.01); *F01N 2900/08* (2013.01); *F01N 2900/10* (2013.01); *F01N 2900/1404* (2013.01); *F01N 2900/1411* (2013.01); *F01N 2900/1602* (2013.01); *F01N 2900/1606* (2013.01); *F02D 41/029* (2013.01); *F02D 2200/0802* (2013.01); *F02D 2200/101* (2013.01); *F02D 2200/501* (2013.01)

(58) Field of Classification Search
CPC ......... F01N 2900/10; F01N 2900/1404; F01N 2900/1411; F01N 2900/1602; F01N 2900/102; F01N 2900/12; F01N 2900/1621; F01N 9/007; F01N 3/208; F02D 41/027; F02D 41/029; F02D 2200/0802; F02D 2200/101; F02D 2200/501; F02D 2200/701; F02D 2200/50; F02D 41/2451; F02D 41/248; Y02A 50/20; Y02T 10/40; Y02T 10/12
See application file for complete search history.

(56) References Cited

U.S. PATENT DOCUMENTS

2017/0370266 A1    12/2017  Togawa et al.
2018/0340784 A1*   11/2018  Upadhyay ............... F01N 9/002

FOREIGN PATENT DOCUMENTS

| CN | 101218420 A | 7/2008 |
|----|-------------|--------|
| CN | 105443215 A | 3/2016 |
| CN | 107524534 A | 12/2017 |
| EP | 1195508 A2 | 4/2002 |
| FR | 2992350 A1 | 12/2013 |
| FR | 3055658 A1 | 3/2018 |
| WO | 2014/191008 A1 | 12/2014 |

OTHER PUBLICATIONS

First Office Action for Chinese Patent Application No. 201880093407.X, dated Oct. 20, 2021, 18 pages.

* cited by examiner

METHOD FOR CONTROLLING REGENERATION OF AN EXHAUST GAS AFTERTREATMENT SYSTEM OF AN INTERNAL COMBUSTION ENGINE ARRANGED ON A VEHICLE

This application is a 35 USC 371 national phase filing of International Application No. PCT/EP2018/062729, filed May 16, 2018, the disclosure of which is incorporated herein by reference in its entirety.

TECHNICAL FIELD

The invention relates to a method for controlling regeneration of an exhaust gas aftertreatment system of an internal combustion engine arranged on a vehicle. The invention also relates to a vehicle adapted to said method. The invention is particularly applicable in working vehicles, such as trucks (heavy-duty, light-duty, etc.), buses and construction equipment.

BACKGROUND

Exhaust gas aftertreatment systems (EATSs) arranged on trucks and other vehicles provided with an internal combustion engine normally require intermittent regeneration for removing various substances that accumulate in the system during normal operation of the vehicle and that affect the performance of the engine or the function of the aftertreatment system. Examples of exhaust gas aftertreatment units that may need regeneration include the following: diesel particulate filter (DPF), diesel oxidation catalyst (DOC), selective catalytic reduction unit (SCR) and urea injection system.

The capability of the exhaust gas to regenerate an exhaust gas aftertreatment unit is primarily dependent on the temperature and the mass flow of the exhaust gas. Regeneration is typically performed by increasing the temperature of the exhaust gas. This way, combustible accumulated substances in a DPF can be burned off. Commonly, the temperature of the gas exhausted by the engine must to be kept above a certain threshold temperature during the regeneration process. If the temperature falls below this threshold, the regeneration will be aborted and a new regeneration process must be performed. Such interrupted regenerations increase the thermal wear of the after-treatment system and also lead to an increase in fuel consumption since increasing the temperature in the system normally is achieved by burning fuel either less efficiently in the engine and/or by adding it after the engine.

Regeneration may be performed either during moving vehicle operation ("moving regeneration") or during standstill vehicle operation ("parked regeneration"). Parked regeneration has the advantage of allowing the engine to be operated in a way that is optimized for a complete and efficient regeneration. On the other hand, moving regeneration saves time (since the vehicle can continue its operation) but increases the risk of having to interrupt the process. Further, in some cases regeneration causes the engine to run a bit different which may be undesired for the driver.

The general routines for handling regeneration, i.e. the predetermined control routines for initializing and performing (including interrupting) regeneration, are set in what is often referred to as a regeneration strategy. Thus, the engine and the exhaust gas system are controlled to operate under a certain regeneration strategy including a number of predetermined actions to be taken for controlling initialization and performance of the regeneration processes. Which actions that are to be taken depend, for instance, on a measured or calculated need for performing a regeneration and on operational data from the engine and/or the exhaust gas after-treatment system, such as engine load and exhaust gas temperature.

The regeneration strategy may include routines for reducing the number of interrupted regeneration processes. For instance, US2017/0370266A1 discloses a strategy where the driver is informed that a parked regeneration is required if the automatic (moving) regenerations have been frequently cancelled. Although the strategy of US2017/0370266A1 sets a threshold for the number of incomplete regenerations until a complete parked regeneration is called for, there will still be a large number of regenerations started over time that will not be completed.

There is a desire to further improve the control of the regeneration process in this type of application.

SUMMARY

An object of the invention is to provide a method for controlling regeneration of an exhaust gas aftertreatment system of an internal combustion engine arranged on a vehicle, which method allows selection of a regeneration strategy that is better adapted to the vehicle operational conditions. The method can in particular be used to identify vehicles not suitable for being subject to moving regenerations and therefore should switch to another strategy that excludes moving regenerations, which would eliminate interrupted regenerations. The object is achieved by a method according to claim 1. Further advantages and advantageous features of the inventive method are disclosed in the following description and in the dependent claims.

The invention concerns a method for controlling regeneration of an exhaust gas aftertreatment system of an internal combustion engine arranged on a vehicle, wherein the vehicle is provided with a control system configured to control the regeneration in at least a first regeneration strategy mode comprising a first set of predetermined actions to be taken for controlling initialization and performance of regeneration processes.

The invention is characterized in that the method comprises the steps of:
  adapting the control system so as to be configured to alternatively control the regeneration in a second regeneration strategy mode, wherein the second regeneration strategy mode comprises a second set of predetermined actions to be taken for controlling initialization and performance of regeneration processes, and wherein the first and second regeneration strategy modes differ from each other in that the first and second set of predetermined regeneration control actions differ from each other;
  collecting, during operation of said vehicle or of another vehicle, data on an exhaust gas regeneration capability of said vehicle or the other vehicle as a function of time;
  evaluating, based on the collected data and the difference between the first and second regeneration strategy modes, whether the first or the second regeneration strategy mode is the most suitable for said vehicle if operating under conditions corresponding to the operational conditions for the vehicle for which data were collected.

An effect of this is that it is possible to, based on the collected data and the evaluation, switch between different regeneration strategies depending on the expected operational conditions. For instance, the first regeneration strategy may include only moving regenerations or both moving and parked regenerations, which is likely to be suitable for a vehicle used for long distance transport of heavy load, and the second regeneration strategy may include only parked regeneration, which is likely to be suitable for lightly loaded stop-and-go vehicles where it is difficult to achieve a sufficiently high exhaust gas temperature unless the engine is operated in a special way that may be undesired for the driver and/or make more noise etc.

Other differences between the regeneration modes may, for instance, be based on different settings for initializing the regeneration process, such as settings of threshold for indicating need for a regeneration (e.g. different threshold for pressure drop over a particulate filter), engine torque, engine power, vehicle speed and exhaust gas temperature. Differences may also relate to duration time of regeneration process and number of interrupted moving regenerations allowed before indicating need for parked regeneration.

Which regeneration mode that should be considered to be the most "suitable" depends on the particular application. Typically, the most suitable mode is the mode that is likely to have the least disturbances on the operation of the vehicle or the mode that is likely to generate the least number of interrupted regenerations under the expected operational conditions.

The collection of data may continue and further evaluations may be made at a suitable frequency to provide information on whether the operational conditions has changed or deviated from what was expected, which in turn may be used for deciding whether to switch back to the former regeneration strategy mode (or switch to a further regeneration mode).

Data may be collected for one vehicle operating under certain operational conditions and the data and evaluation may be used to select regeneration strategy mode for another vehicle operating or being intended to operate under similar conditions.

The exhaust gas regeneration capability (EGRC) may be expressed and measured in different ways. A quantity or property that is related to the exhaust gas regeneration capability, such as engine power, engine load, engine torque, exhaust gas temperature and exhaust gas power, may be measured and/or determined, separately or in combination, as a representation of the EGRC. Such quantities or properties may be denoted exhaust gas regeneration capability equivalents.

The step of collecting data on EGRC as a function of time during operation of the vehicle means that the EGRC (or another quantity representing the EGRC) is determined during a certain point or short interval in time, wherein the two values (EGRC and time) are collected. Such values may be obtainable from equipment already provided on a modern vehicle, such as an engine or vehicle control unit. The data may be stored on-board during operation of the vehicle or sent wireless to another unit/computer.

As explained more in detail below, the data on EGRC and time may be used to provide a further collection of data points, each of which representing a certain length of an individual drive cycle and a representative value of the EGRC, such as an average engine power. Such a collection of data points can be used for evaluating whether a certain regeneration strategy mode is suitable for a given pattern of operational conditions. For instance, if the data shows that the vehicle operation exhibits a large number of short drive cycles with low engine power the vehicle may be classified as not suitable for moving regeneration and a strategy mode with only parked regeneration may be selected (if not already operating in such a mode) since moving regenerations are likely to be interrupted or require special operation of the engine. Conversely, if the data shows that the vehicle operation exhibits mostly long drive cycles with high engine power a strategy mode with moving regeneration is suitable.

According to one embodiment, the method further comprises the step of: setting, or attracting attention to the possibility to set, the control system to control the regeneration in that regeneration strategy mode that, based on said evaluation, was considered to be the most suitable for said operational conditions. This is typically carried out in case the vehicle is to be operated under conditions similar to the operational conditions for the vehicle for which data were collected and in case the control system is set to control the regeneration in a regeneration strategy mode that, based on said evaluation, was not the most suitable mode (in which case "setting the mode" means switching mode). Data collection and evaluation may, however, be performed without switching regeneration strategy mode (or without attracting attention to the possibility of switching mode for improving regeneration efficiency) as it might be that the most suitable mode is already activated. It may also be that no regeneration strategy mode is currently activated before the step of setting the mode, in which case "setting the mode" means activating the (most suitable) mode.

In an example this means that if a vehicle is intended to continue operating under the same conditions and data has been collected and evaluated for the same vehicle, and further that the current regeneration strategy mode is not the most suitable, the strategy mode is changed to a more suitable mode, or attention is attracted to the possibility to change mode (by, for instance, indicating to a driver of the vehicle or a workshop that another regeneration strategy is more suitable). If it turns out that the most suitable strategy mode already is used there is no need to change mode. The vehicle does not have to be operating under exactly the same operational conditions as the vehicle for which data were collected to gain on switching mode.

According to a further embodiment, the difference between the first and second regeneration strategy modes includes one or several of the following: i) an option to carry out a regeneration process while the vehicle is in motion (moving regeneration) is not available in one of the first and second regeneration strategy modes; ii) a maximum number of initialized but not completed regeneration processes while the vehicle is in motion is higher in one of the first and second regeneration strategy modes; iii) a total time allowed for an individual regeneration process is longer in one of the first and second regeneration strategy modes; and iv) performing regeneration while the vehicle is not moving (parked regeneration) is not available in one of the first and second regeneration strategy modes.

According to a further embodiment, the first regeneration strategy mode provides an option to perform a regeneration process while the vehicle is in motion (moving regeneration), wherein the second regeneration strategy mode does not provide the option to perform a regeneration process while the vehicle is in motion (moving regeneration). Preferably, the second regeneration strategy mode requires the vehicle to stand still during a regeneration process (parked regeneration).

According to a further embodiment, the data on the exhaust gas regeneration capability are obtained from a representation of the exhaust gas regeneration capability in the form of one or several of the following: engine speed, engine torque, engine power, vehicle speed, vehicle mass, temperature of aftertreatment system, exhaust gas temperature and exhaust gas mass flow.

According to a further embodiment, the step of collecting the data includes the step of:

obtaining a first set of paired data, each of which comprising a value of one or several representations of the exhaust gas regeneration capability and a point in time, wherein the first set of paired data are distributed over a time period reflecting the operational conditions for the vehicle for which data are collected. The first set of paired data may in principle be obtained as often as possible, for instance each second during operation of the vehicle. As an example, the value of the engine power and/or the vehicle speed may be obtained every second and be paired with the corresponding point in time during operation of the vehicle. For statistical reasons, the correctness of the reflection of the operational conditions of the vehicle increases with the total time period over which the first set of paired data are distributed. How many days or weeks of data collection that would be needed for a sufficiently reliable result depends on the particular application, for instance, it depends on how much the operational conditions differ from day to day (and from hour to hour and week to week). In general, one or a few weeks of data collection may be a sufficient time period for forming a basis for taking a decision on which regeneration strategy mode to be used.

According to a further embodiment, the step of evaluating the collected data comprises the step of: providing a second set of paired data, each of which comprising a drive cycle time period and a representative value of the one or several representations of the exhaust gas regeneration capability. The drive cycle time period, i.e. the length of an individual drive cycle, may vary from some minutes to several hours. The representative value of the EGRC for a particular drive cycle time period may be, for instance, an average engine power or vehicle speed during the drive cycle time period.

According to a further embodiment, the drive cycle time period is defined to be a time period during which the one or several representations of the exhaust gas regeneration capability is generally above a threshold level. As an example, if engine power is used as the representation of the EGRC a threshold of around 20-50 kW may be suitable for a vehicle in the form of a truck. Thus, a certain drive cycle time period may be considered to be the time period during which the engine power is generally above, say 50 kW. Which threshold to use depends on the particular vehicle and application.

According to a further embodiment, the one or several representations of the exhaust gas regeneration capability is considered to be generally above the threshold level provided that the one or several representations of the exhaust gas regeneration capability is below the threshold level only during one or several predefined and relatively short maximum periods of time within the drive cycle time period. The maximum below-threshold period of time can be set to, for instance, two minutes to allow short stops, for instance stops at traffic lights, during the same drive cycle time period. If the one or several representations of the exhaust gas regeneration capability is below the threshold level for a longer time than this maximum period, e.g. two minutes, the drive cycle time period is considered to be terminated. The drive cycle time period may be considered to be terminated also in case the engine power or other representation of the EGRC falls below the threshold a certain number of times during the drive cycle time period. After termination of a first drive cycle time period the start of a subsequent drive cycle time period may be considered to be the point in time when the engine power or other representation of the EGRC again increases above the threshold.

According to a further embodiment, the representative value of the one or several representations of the exhaust gas regeneration capability is an average of the one or several representations of the exhaust gas regeneration capability. The sample frequency for obtaining the first set of paired data (EGRC and time) is suitably arranged so that several data are obtained during a typical drive cycle time period. The average value of the representation of the EGRC can be used in the second set of paired data.

According to a further embodiment, the second set of paired data is used for determining which of the first and second regeneration strategies is the most suitable for said vehicle under the operational conditions of interest. Each of these data contains the length of a particular drive cycle time period and the corresponding representative value of the one or several representations of the EGRC, such as the average engine power, during that particular drive cycle time period. Exactly how to handle the data and decide on regeneration strategy may depend on the particular situation.

The data may for instance show that all drive cycle time periods are short and that the average engine power (or other representative value for the EGRC) in all drive cycle time periods is low. This calls for a regeneration strategy mode including only parked regeneration. The other extreme is that all drive cycle time periods are long and that the average engine power (or other representative value for the EGRC) in all drive cycle time periods is high. This calls for a regeneration strategy mode where moving regeneration is the general option. In most situations it is likely that the second set of paired data will show more or less scattered data, i.e. a mix of short and long drive cycle time periods and low and high average engine power (or other representative value for the EGRC).

To visualize the second set of paired data one may plot the data with time (length of drive cycle time period) on the x-axis and average engine power (or other representative value for the EGRC) on the y-axis. An accumulation of data in the lower left corner (short time periods, low EGRC) suggests that parked regeneration is preferred, whereas an accumulation of data in the upper right corner (long time periods, high EGRC) suggests that moving regeneration is preferred. To further improve visualization, or to simplify handling of the data, one may group the data together in bins, each of which covering a certain range of drive cycle time periods and a certain range of average engine power (or other representative value for the EGRC) and sum up the number of data points in each bin. Visualization of the data may not be necessary if a proper algorithm has been developed for calculating which regeneration strategy mode is the most suitable.

The method may include that the step of determining which of the first and second regeneration strategies is the most suitable is based on whether a certain fraction of the data points in the second set of paired data exhibit a drive cycle time period that is longer than a threshold drive cycle length and/or an average engine power (or other representative value for the EGRC) that is higher than a threshold average engine power (or other representative value for the EGRC). For instance, if the data shows that 80% of the drive cycle time periods are shorter than the threshold drive cycle length and that also 80% of the data on average engine power (or other representative value for the EGRC) is below the threshold average engine power (or other representative value for the EGRC), it may be determined that a second strategy that includes only parked regeneration is the most suitable regeneration strategy mode. What fractions and thresholds to be used depends on the vehicle and the application. Several values may be used for these fractions and thresholds to adapt the method to a case where there is a selection of more than two regeneration strategy modes.

According to a further embodiment, the step of collecting the data comprises the step of: obtaining the number of times a regeneration process initiated while the vehicle is in motion (moving regeneration) has been interrupted before completion and/or obtaining the number of times a regeneration process has been performed during standstill conditions (parked regeneration). This information may be included when determining which of the first and second regeneration strategies is the most suitable.

According to a further embodiment, wherein attracting attention to the possibility to set the control system to control the regeneration in the most suitable regeneration strategy mode comprises indicating to a driver of the vehicle or a workshop that another suitable regeneration strategy is more suitable. Switching strategy can then be performed by the driver or by a service engineer at service of the vehicle.

According to a further embodiment, the first and second set of predetermined actions to be taken for controlling initialization and performance of regeneration processes are based on at least a measured or calculated need for performing a regeneration process as well as operational data from the engine and/or the exhaust gas aftertreatment system. These predetermined actions to be taken are changed when changing regeneration strategy mode, which in turn is changed (if considered suitable) after data collection and data evaluation.

The invention also concerns a vehicle comprising an internal combustion engine and an exhaust gas system provided with an exhaust gas aftertreatment system, wherein the vehicle is provided with a control system configured to control a regeneration of the exhaust gas aftertreatment system in a first or a second regeneration strategy mode, wherein the first regeneration strategy mode comprises a first set of predetermined actions to be taken for controlling initialization and performance of regeneration processes, wherein the second regeneration strategy mode comprises a second set of predetermined actions to be taken for controlling initialization and performance of regeneration processes, and wherein the first and second regeneration strategy modes differ from each other in that the first and second set of predetermined regeneration control actions differ from each other, and wherein the control system is configured to allow a selection of which of the first or second regeneration strategy modes to be used for controlling the regeneration of the exhaust gas aftertreatment system.

The invention also concerns a computer program product, a computer readable medium and a control system related to performance of the steps of the inventive method.

The effects and features of the further aspects of the invention are largely analogous to those described above in relation to the first aspect of the invention, i.e. the method.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

DETAILED DESCRIPTION OF EXAMPLE EMBODIMENTS OF THE INVENTION

Figure 1:
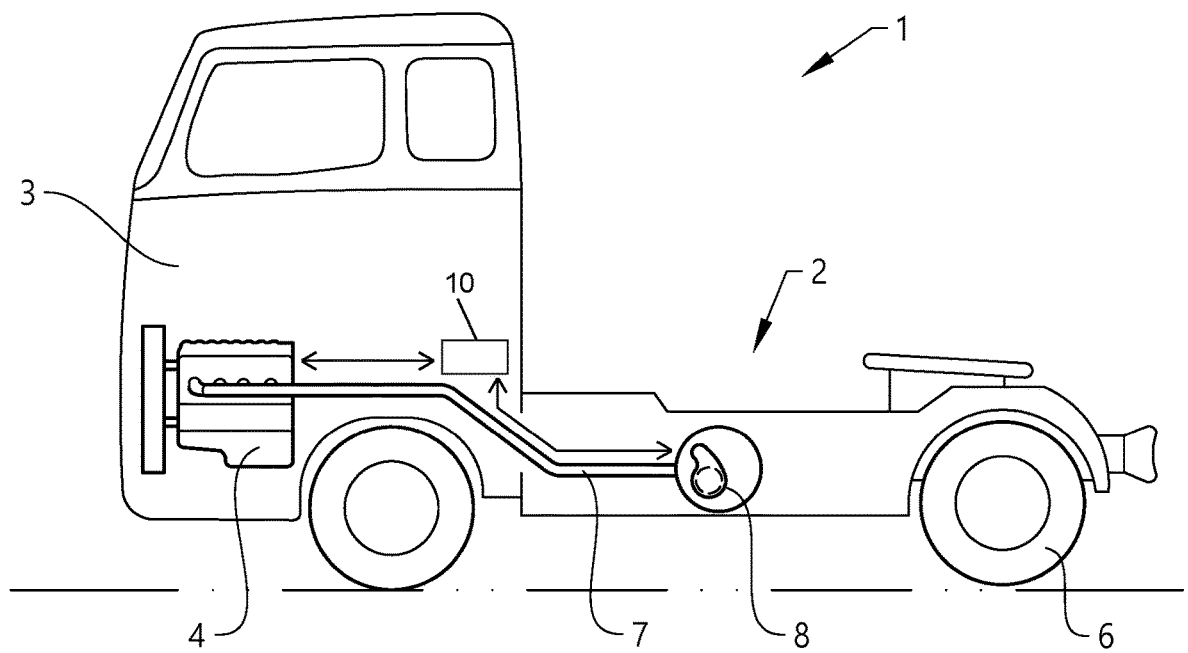
FIG. 1 shows, in a schematic view, a vehicle with an engine and an exhaust gas system to which the inventive method can be applied.

FIG. 1 shows a commercial vehicle 1 in the form of a tractor unit. The commercial vehicle 1 comprises a chassis 2 and a driver's cab 3 mounted on the chassis and a control system 10. Underneath the driver's cab 3 is an internal combustion engine 4, which acts on the drive wheels 6 of the commercial vehicle 1 by way of a drive train comprising a clutch and a manual transmission or an automatic transmission. The internal combustion engine 4 comprises an exhaust gas system 7 with a first muffler 8 provided with an exhaust after-treatment system (EATS) including, for instance, a diesel particulate filter (DPF) connected to a tailpipe (not shown) which expels the exhaust gases to the atmosphere.

As an example, the inventive method is applicable to a vehicle of the type shown in FIG. 1 for carrying out regeneration of the DPF.

Figure 2:
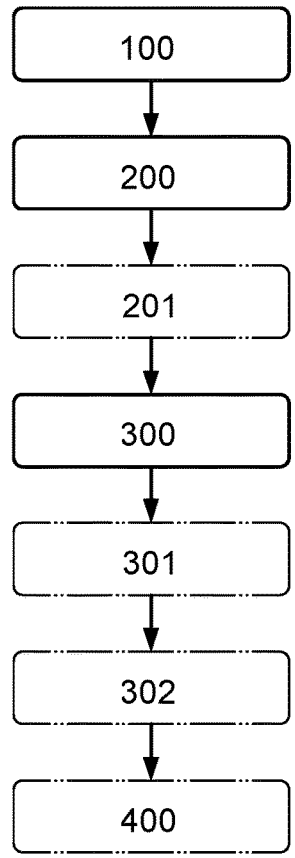
FIG. 2 shows a flow diagram for an embodiment of the inventive method.
Figure 4:
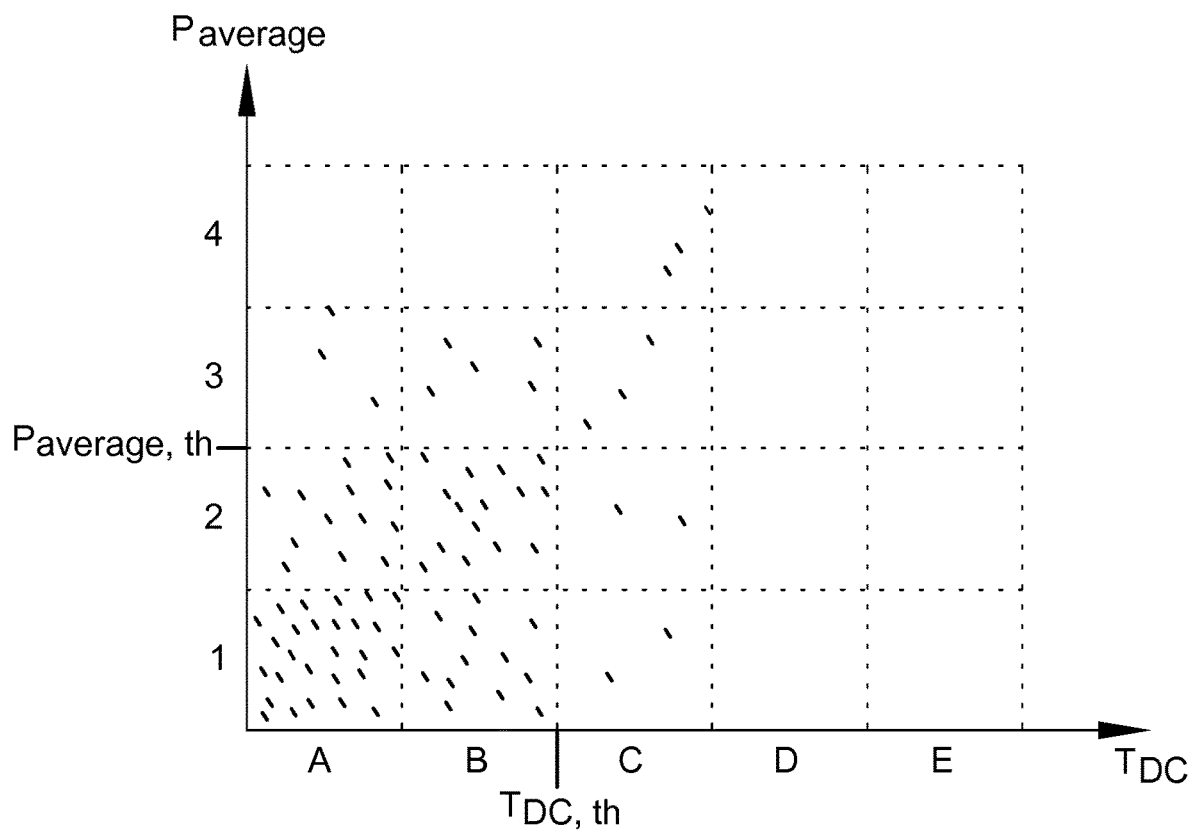
FIG. 4 shows an example of how to evaluate data on drive cycle time period and EGRC.

FIG. 2 shows a flow diagram for an embodiment of the inventive method for controlling regeneration of the DPF of the exhaust gas aftertreatment system of the internal combustion engine 4 arranged on the vehicle 1. In this example only one vehicle is involved. The vehicle is intended to be operated under the same conditions as during the data collection and the vehicle is run in the first regeneration strategy mode before the evaluation. In the example of FIG. 2 the method comprises the steps of:

100—providing the vehicle 1 with a control system 10 (also referred to as "vehicle control unit 10") is configured to control the regeneration in a first or a second regeneration strategy mode, wherein each of the first and second regeneration strategy modes comprises a corresponding set of predetermined actions to be taken for controlling initialization and performance of regeneration processes, wherein the first and second regeneration strategy modes differ from each other in that the corresponding sets of predetermined regeneration control actions differ from each other in such a way that the first regeneration strategy mode provides an option to perform a regeneration process while the vehicle is in motion (moving regeneration), whereas the second regeneration strategy mode requires the vehicle to stand still during a regeneration process (parked regeneration);

200—collecting, during operation of the vehicle 1, data on an exhaust gas regeneration capability (EGRC) of the vehicle 1 as a function of time; wherein the data on the EGRC are obtained from a representation of the EGRC, in this example in the form of engine power;

wherein the step 200 of collecting the data includes the step of:

201—obtaining a first set of paired data, each of which comprising a value of the engine power P and a point in time t (see example in FIG. 3), wherein the first set of paired data in this case are obtained with 10 seconds interval during operation of the vehicle and are distributed over a time period covering one month of operation;

300—evaluating, based on the collected data and the difference between the first and second regeneration strategy modes, whether the first or the second regeneration strategy mode is the most suitable for said vehicle 1 if operating under conditions corresponding to the operational conditions during data collection;

wherein the step 300 of evaluating the collected data comprises the steps of:

301—providing a second set of paired data, each of which comprising a length of a drive cycle time period $T_{DC}$ and, in this example, an average value of the engine power P average (see example in FIG. 4); wherein the drive cycle time period is the time period during or several predefined and relatively short maximum periods of time $\Delta t_{th}$ within the drive cycle time period $T_{DC}$;

302—determining that the second regeneration strategy mode is the most suitable based on that a certain fraction of the data points in the second set of paired data exhibit a drive cycle time period $T_{DC}$ that is shorter than a threshold drive cycle length $T_{DC,th}$ and an average engine power $P_{average}$ that is lower than a threshold average engine power $P_{average,th}$ (see FIG. 4);

400—setting the control system to control the regeneration in the second regeneration strategy mode that, based on said evaluation, was considered to be the most suitable for said operational conditions.

Partly dotted frames are used for boxes 201, 301, 302 and 400 in FIG. 2 so as to reflect method steps that are optional or that at least can be performed in various ways.

Figure 3:
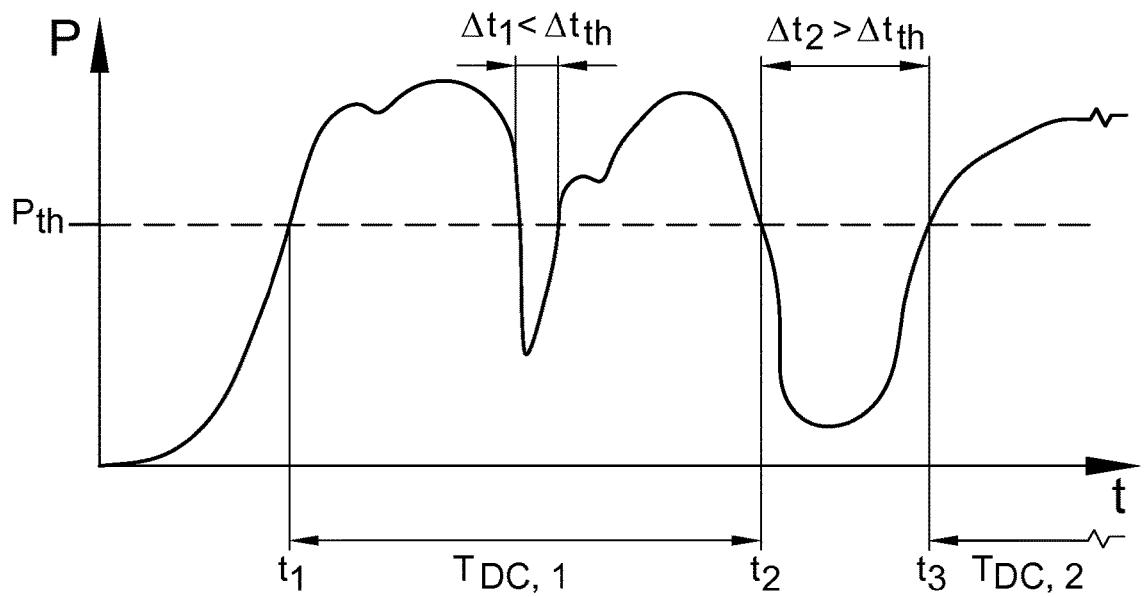
FIG. 3 shows an example of how to determine the length of a drive cycle time period.

FIG. 3 shows, in a schematic view, an example of how to determine the length of a drive cycle time period $T_{DC}$. The x-axis shows time t and the y-axis shows engine power P. Values of the engine power has been obtained at a certain sample frequency so as to form a first set of paired data, each of which comprising a value of the engine power P (as an example of one or several representations of the exhaust gas regeneration capability) and a point in time. In FIG. 3 the data points are represented by a curve. FIG. 3 shows only a very small part (a short time period) of the entire the first set of paired data that are distributed over a much longer time period to reflect the operational conditions for the vehicle.

A first drive cycle time period $T_{DC,1}$, starts at $t_1$ when the engine power P increases and passes above an engine power threshold $P_{th}$. The power P is generally above the threshold $P_{th}$ until $t_2$ when the power falls below the $P_{th}$ for a time period $\Delta t_2$, which is longer than a predefined and relatively short maximum period of time $\Delta t_{th}$, which is used to separate one drive cycle time period from the next. In this case the next drive cycle time period $T_{DC,2}$ starts at $t_3$ when the power reaches above the threshold $P_{th}$ again. The quick drop in engine power for the time period $\Delta t_1$ in around the middle of the first drive cycle time period $T_{DC}$ is shorter than the allowed maximum period of time $\Delta t_{th}$, and therefore it is considered that the first drive cycle time period $T_{DC,1}$, generally extends from $t_1$ to $t_2$ and has the length $T_{DC,1}$. As an example, the length of $\Delta t_{th}$ may be set to 2-3 minutes. The length of $T_{DC}$ in FIG. 3 might then be around 45 min. As a further example, the engine power threshold $P_{th}$ may be set to 50 kW.

FIG. 4 shows, in schematic view, an example of how to visualize and evaluate data on drive cycle time period and EGRC, in this case exemplified with the average engine power $P_{average}$. These data are called the second set of paired data and are used for determining which of the first and second regeneration strategies is the most suitable for said vehicle under the operational conditions of interest. Each of these data contains the length of a particular drive cycle time period, e.g. 45 min for $T_{DC}$ in line with FIG. 3, and the corresponding average engine power during that particular drive cycle time period, i.e. say around 70 kW for $T_{DC}$ in line with FIG. 3 (or at least somewhat higher than the threshold of 50 kW).

FIG. 4 shows length of drive cycle time period $T_{DC}$ on the x-axis and average engine power $P_{average}$ on the y-axis. Each of the data points in FIG. 4, i.e. each dot, represents a length of a certain drive cycle time period and a corresponding average engine power during said certain drive cycle time period. Indicated in FIG. 4 are also a threshold drive cycle length $T_{DC,th}$ and a threshold average engine power $P_{average,th}$.

As exemplified in FIG. 4, the data are clearly accumulated in the lower left corner (short time periods, low EGRC), which suggests that parked regeneration is preferred to avoid interrupted regeneration processes (or special controlling of the engine). The x- and y-axes are divided into segments A-E and 1-4, respectively, forming bins/areas A1, A2, etc., each of which covering a certain range of drive cycle time periods and a certain range of average engine power in the diagram of FIG. 4. This can be used to further improve visualization, or to simplify handling of the data, by grouping the data together in the bins and sum up the number of data points in each bin. Instead of showing the individual data points as in FIG. 4 it is thus an alternative to show, and work with, the total number of data points in each bin.

If all data would have been clearly accumulated in the upper right corner (e.g. bins D4 and E4 with long time periods and high EGRC) it would suggest the use of a regeneration strategy mode where moving regeneration is the general option. In most situations it is likely that the second set of paired data will show more or less scattered data, i.e. a mix of short and long drive cycle time periods and low and high average engine power (or other representative value for the EGRC).

To objectively determine which regeneration strategy mode to use, the determination may be based on whether a certain portion of the data points in the second set of paired data exhibit both a drive cycle time period that is longer than the threshold drive cycle length $T_{DC,th}$ as well as an average engine power that is higher than the threshold average engine power $P_{average,th}$. For instance, this "certain portion of the data points" may be set to 50%, i.e. if 50% of the data points are above the two thresholds (drive cycle length $T_{DC,th}$, and average engine power $P_{average,th}$) the first regeneration strategy mode is selected as the most suitable. So, if the data show that only 20% of the data points are above the thresholds (i.e. 80% of the data points are located in the bins A1, A2, B1, B2, which is roughly the case in FIG. 4), this may be used to decide that the second strategy that includes only parked regeneration is the most suitable regeneration strategy mode. Other values for the portions and thresholds may be used depending on the vehicle and the application.

It is to be understood that the present invention is not limited to the embodiments described above and illustrated in the drawings; rather, the skilled person will recognize that many changes and modifications may be made within the scope of the appended claims. For instance, instead of using only the engine power P as a representation of the EGRC it is possible to use another representation, such as vehicle speed or exhaust gas temperature, or to use a combination of representations.

The invention claimed is:

1. A method for controlling regeneration of an exhaust gas aftertreatment system of an internal combustion engine of a vehicle, the method comprising:
collecting, during operation of the vehicle or of another vehicle, data on an exhaust gas regeneration capability of the vehicle or the other vehicle as a function of time;
evaluating by a control system based on the collected data and a difference between a first and a second regeneration strategy mode, whether the first or the second regeneration strategy mode is most suitable for the vehicle if operating under conditions corresponding to the operational conditions for the vehicle for which data were collected;
wherein the first regeneration strategy mode comprises a first set of predetermined actions to be taken for controlling initialization and performance of regeneration processes, and the second regeneration strategy mode comprises a second set of predetermined actions to be taken for controlling initialization and performance of regeneration processes different from the first set of predetermined actions; and
in response to evaluating the first regeneration strategy mode is the most suitable for the vehicle:
the control system controlling the regeneration in the first regeneration strategy mode comprises the first set of predetermined actions to be taken for controlling initialization and performance of regeneration processes; and
performing the first set of predetermined actions to the exhaust gas aftertreatment system to perform a first regeneration in the exhaust gas aftertreatment system; and
in response to evaluating the second regeneration strategy mode is the most suitable for the vehicle:
the control system controlling the regeneration in the second regeneration strategy mode comprises the second set of predetermined actions to be taken for controlling initialization and performance of regeneration processes; and
performing the second set of predetermined actions to the exhaust gas aftertreatment system to perform a second regeneration in the exhaust gas aftertreatment system.

2. The method of claim 1, wherein the method further comprises the control system setting to control the regeneration in the second regeneration strategy mode that, based on the evaluation, was considered to be the most suitable for the operational conditions.

3. The method of claim 1, wherein the difference between the first and second regeneration strategy modes includes at least one of:
an option to carry out a regeneration process while the vehicle in motion is not available in one of the first and second regeneration strategy modes;
a maximum number of initialized but not completed regeneration processes while the vehicle in motion is higher in one of the first and second regeneration strategy modes;
a total time allowed for an individual regeneration process is longer in one of the first and second regeneration strategy modes; and
performing regeneration while the vehicle while not moving is not available in one of the first and second regeneration strategy modes.

4. The method of claim 1, wherein the first regeneration strategy mode provides an option to perform a regeneration process while the vehicle is in motion, and the second regeneration strategy mode does not provide the option to perform a regeneration process while the vehicle is in motion.

5. The method of claim 4, wherein the second regeneration strategy mode requires the vehicle to stand still during a regeneration process.

6. The method of claim 1, wherein the data on the exhaust gas regeneration capability are obtained from a representation of the exhaust gas regeneration capability in the form of at least one of: engine speed, engine torque, engine power, vehicle speed, vehicle mass, temperature of aftertreatment system, exhaust gas temperature, and exhaust gas mass flow.

7. The method of claim 1,
wherein the step of collecting the data includes obtaining a first set of paired data, each of which comprise a value of at least one representation of the exhaust gas regeneration capability and a point in time, and
wherein the first set of paired data are distributed over a time period reflecting the operational conditions for the vehicle for which data are collected.

8. The method of claim 7, wherein the step of the control system evaluating the collected data comprises providing a second set of paired data, each of which comprise a drive cycle time period and a representative value of the one or several representations of the exhaust gas regeneration capability.

9. The method of claim 8, wherein the drive cycle time period is defined to be a time period during which the one or several representations of the exhaust gas regeneration capability is generally above a threshold level.

10. The method of claim 9, wherein the one or several representations of the exhaust gas regeneration capability is considered to be generally above the threshold level provided that the at least one representation of the exhaust gas regeneration capability is below the threshold level only during one or several predefined and relatively short maximum periods of time within the drive cycle time period.

11. The method of claim 8, wherein the representative value of the at least one representation of the exhaust gas regeneration capability is an average of the at least one representation of the exhaust gas regeneration capability.

12. The method of claim 8, wherein the second set of paired data is used for determining which of the first and second regeneration strategy modes is the most suitable for the vehicle under the operational conditions of interest.

13. The method of claim 1, wherein the step of collecting the data comprises obtaining the number of times a regeneration process initiated while the vehicle in motion has been interrupted before completion and/or obtaining the number of times a regeneration process has been performed during standstill conditions.

14. The method of claim 2, wherein attracting attention to the possibility to set to control the regeneration in the most suitable regeneration strategy mode comprises indicating to a driver of the vehicle or a workshop that another suitable regeneration strategy is more suitable.

15. The method of claim 1, wherein the first and second sets of predetermined actions to be taken for controlling initialization and performance of regeneration processes are based on:
at least a measured or calculated need for performing a regeneration process; and
operational data from the engine and/or the exhaust gas aftertreatment system.

16. A vehicle comprising an internal combustion engine and an exhaust gas system provided with an exhaust gas aftertreatment system and a control system, wherein:

the control system is configured to:

control a regeneration;

evaluate based on data on an exhaust gas regeneration capability of the vehicle or of another vehicle as a function of time and the difference between a first and a second regeneration strategy mode, whether the first or the second regeneration strategy mode is the most suitable for the vehicle if operating under conditions corresponding to the operational conditions for the vehicle for which data were collected, wherein the first regeneration strategy mode comprises a first set of predetermined actions to be taken for controlling initialization and performance of regeneration processes and the second regeneration strategy mode comprises a second set of predetermined actions to be taken for controlling initialization and performance of regeneration processes different from the first set of predetermined actions; and in response to evaluation of the first regeneration strategy mode being the most suitable for the vehicle:

select the regeneration in the first regeneration strategy mode comprising the first set of predetermined actions to be taken for controlling initialization and performance of regeneration processes; and in response to evaluation of the second regeneration strategy mode being the most suitable for the vehicle:

select the regeneration in the second regeneration strategy mode comprising the second set of predetermined actions to be taken for controlling initialization and performance of regeneration processes; and the vehicle is configured to:

perform the first set of predetermined actions to the exhaust gas aftertreatment system to perform a first regeneration in the exhaust gas aftertreatment system based on the control system controlling the regeneration in the first regeneration strategy mode; and perform the second set of predetermined actions to the exhaust gas aftertreatment system to perform a second regeneration in the exhaust gas aftertreatment system based on the control system the regeneration in the second regeneration strategy mode.

17. The vehicle of claim 16, wherein the difference between the first and second regeneration strategy modes includes at least one of:

an option to carry out a regeneration process while the vehicle in motion is not available in one of the first and second regeneration strategy modes;

a maximum number of initialized but not completed regeneration processes while the vehicle in motion is higher in one of the first and second regeneration strategy modes;

a total time allowed for an individual regeneration process is longer in one of the first and second regeneration strategy modes; and performing regeneration while the vehicle while not moving is not available in one of the first and second regeneration strategy modes.

18. The vehicle of claim 16, wherein the first regeneration strategy mode provides an option to perform a regeneration process while the vehicle is in motion, and the second regeneration strategy mode does not provide the option to perform a regeneration process while the vehicle is in motion.

19. The vehicle of claim 18, wherein the second regeneration strategy mode requires the vehicle to stand still during a regeneration process.

* * * * *